United States Patent
Tharp (10) Patent No.: US 8,328,289 B2
(45) Date of Patent: Dec. 11, 2012

(54) BELT RETAINING SYSTEM FOR CHILD SAFETY SEAT

(76) Inventor: Bruce M Tharp, Chicago, IL (US)

(*) Notice: Subject to any disclaimer, the term of this patent is extended or adjusted under 35 U.S.C. 154(b) by 96 days.

(21) Appl. No.: 12/854,696

(22) Filed: Aug. 11, 2010

(65) Prior Publication Data

US 2011/0037302 A1 Feb. 17, 2011

Related U.S. Application Data

(60) Provisional application No. 61/273,978, filed on Aug. 12, 2009.

(51) Int. Cl.
*A47D 15/00* (2006.01)
*B60R 22/10* (2006.01)
*A44B 6/00* (2006.01)

(52) U.S. Cl. ............... 297/481; 297/482; 297/250.1; 24/3.1

(58) Field of Classification Search ............ 297/481, 297/482, 250.1; 24/3.1
See application file for complete search history.

(56) References Cited

U.S. PATENT DOCUMENTS

| | | | | |
|---|---|---|---|---|
| 4,595,618 A * | 6/1986 | Caringer | ............ | 297/482 X |
| 4,946,198 A * | 8/1990 | Pittore et al. | ............ | 297/482 X |
| 5,080,396 A * | 1/1992 | Vacanti | ............ | 297/482 X |
| 5,135,257 A * | 8/1992 | Short | ............ | 297/482 X |
| 5,215,333 A * | 6/1993 | Knight | ............ | 297/482 X |
| 5,261,728 A * | 11/1993 | Carmichael | ............ | 297/482 |
| 5,570,933 A * | 11/1996 | Rouhana et al. | ............ | 297/482 X |
| 6,305,745 B1 * | 10/2001 | Rijsdijk | ............ | 297/250.1 |
| 7,011,375 B1 * | 3/2006 | Tyler | ............ | 297/482 |
| 7,104,570 B2 * | 9/2006 | Hearn et al. | ............ | 297/481 X |
| 7,445,286 B2 * | 11/2008 | Siewertsen et al. | ............ | 297/250.1 |
| 7,458,636 B2 * | 12/2008 | Chen et al. | ............ | 297/481 X |
| 7,585,026 B2 * | 9/2009 | Kassai et al. | ............ | 297/250.1 |
| 7,735,919 B2 * | 6/2010 | Chen et al. | ............ | 297/481 X |
| 2005/0179289 A1 * | 8/2005 | Fuller et al. | ............ | 297/250.1 |
| 2011/0049950 A1 * | 3/2011 | Pereira | ............ | 297/482 X |
| 2011/0156469 A1 * | 6/2011 | Carpenter | ............ | 297/482 |
| 2011/0227392 A1 * | 9/2011 | Morrissey | ............ | 297/482 |

OTHER PUBLICATIONS www.littlebumblebaby.com, Best Accessories for Cconvertible & Infant Car Seats, Strollers, and Highchairs, Aug. 10, 2010, 1 page.
www.littlebumblebaby.com, Best Accessories for Cconvertible & Infant Car Seats, Strollers, and Highchairs2, Aug. 10, 2010, 2 p. 2.
www.littlebumblebaby.com, Best Accessories for Cconvertible & Infant Car Seats, Strollers, and Highchairs3, Aug. 10, 2010, 2 pages.
www.littlebumblebaby.com, Buckle-Pals Highchair Accessories, Aug. 10, 2010, 1 page.
www.littlebumblebaby.com, One-of-a-kind stroller accessory that keeps seat belts aside while you seat your child, Aug. 10, 2010, 1 page.

* cited by examiner

*Primary Examiner* — Rodney B White (57) ABSTRACT

Certain embodiments of the present invention provide a harness belt retaining system for a child safety seat. The system includes a first portion including a first attachment portion and configured to secure to a chest clip on a harness belt. The first portion may be configured to be removably secured to the chest clip. The first portion may include a strap. The strap may include a first end and a second end. The first end may include an aperture configured to receive the second end. The strap may be configured to form a loop having an adjustable size, such that the loop can secure to the chest clip. The first portion may have a first surface and a second surface. Each of the surfaces may include the first attachment portion. The first portion may include a toy or a decorative tag.

15 Claims, 7 Drawing Sheets

BELT RETAINING SYSTEM FOR CHILD SAFETY SEAT

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This application claims priority to U.S. Provisional Patent Application No. 61/273,978, filed on Aug. 12, 2009, which is herein incorporated by reference.

A child safety seat may be referred to as an infant safety seat, a child restraint system, a restraint car seat, or as car seats. Child safety seats may include infant seats, convertible seats, and booster seats. In a vehicle (e.g., car, truck, bicycle, etc.), a child safety seat may be designed to protect children. Manufacturers may integrate child safety seats directly into their vehicle's design. Child safety seats may also be purchased and installed by consumers. In addition to vehicles, child safety seats may be implemented in high-chairs, strollers, and other devices/apparatuses in which such protection would be desirable. Child safety seats may have harness belts. Such belts may tend to sag into the back rest or seat-bottom area of the child safety seat. When placing a child into the child safety seat, it may be first necessary to move the harness belts. Alternately, it may be necessary to fish the harness belts from under the child once he or she has been placed into the child safety seat.

BRIEF SUMMARY OF THE INVENTION

Certain embodiments of the present invention provide a harness belt retaining system for a child safety seat. The system includes a first portion including a first attachment portion and configured to secure to a chest clip on a harness belt. The first portion may be configured to be removably secured to the chest clip. The first portion may include a strap. The strap may include a first end and a second end. The first end may include an aperture configured to receive the second end. The strap may be configured to form a loop having an adjustable size, such that the loop can secure to the chest clip. The first portion may have a first surface and a second surface. Each of the surfaces may include the first attachment portion. The first portion may include a toy or a decorative tag.

The first portion is configured to be secured through at least one aperture in the chest clip. The first portion may be configured to be interposed between a portion of the front of the harness belt and a portion of the chest clip. The first portion may have a thickness selected to permit the chest clip to be adjusted along a length of the harness belt.

The system also includes a second portion including a second attachment portion configured to be located on a lateral portion of the child safety seat. The lateral portion may include a portion of a seat frame or a portion of a carrier arm. The second portion may have a first surface and a second surface. The first surface may have an adhesive selected to secure the second portion to the lateral portion of the child safety seat. Further, the second surface may include the second attachment portion. The second portion and the second attachment portion may include a fabric of the child safety seat.

The first attachment portion and second attachment portion are configured to removably attach to each other. In an embodiment, the first attachment portion and the second attachment portion comprise a hook-and-loop fastener. Additionally, the location on the lateral portion of the child safety seat is selected to pull the chest clip away from a back rest of the child safety seat when the first attachment portion and the second attachment portion are attached to each other.

Certain embodiments of the present invention provide a harness belt retaining system for a child safety seat having a first portion including a first attachment portion and a strap. The first portion is configured to secure to a rigid encompassing portion on a harness belt. The rigid encompassing portion may include a chest clip. The first portion may be configured to be secured through at least one aperture in the rigid encompassing portion.

The system also includes a second portion including a second attachment portion. The second attachment portion is configured to be located on a lateral portion of the child safety seat. The lateral portion may include a portion of at least one of a seat frame or a carrier arm.

The first attachment portion and second attachment portion are configured to be removably attached to each other such that the strap is interposed between the second attachment portion and the rigid encompassing portion. Furthermore, the location on the lateral portion of the child safety seat is selected to pull the rigid encompassing portion away from a back rest of the child safety seat when the first attachment portion and the second attachment portion are attached to each other. The first attachment portion and the second attachment portion may include a hook-and-loop fastener.

The foregoing summary, as well as the following detailed description of certain embodiments of the present invention, will be better understood when read in conjunction with the appended drawings. For the purposes of illustration, certain embodiments are shown in the drawings. It should be understood, however, that the claims are not limited to the arrangements and instrumentality shown in the attached drawings.

DETAILED DESCRIPTION OF THE INVENTION

Figure 1:
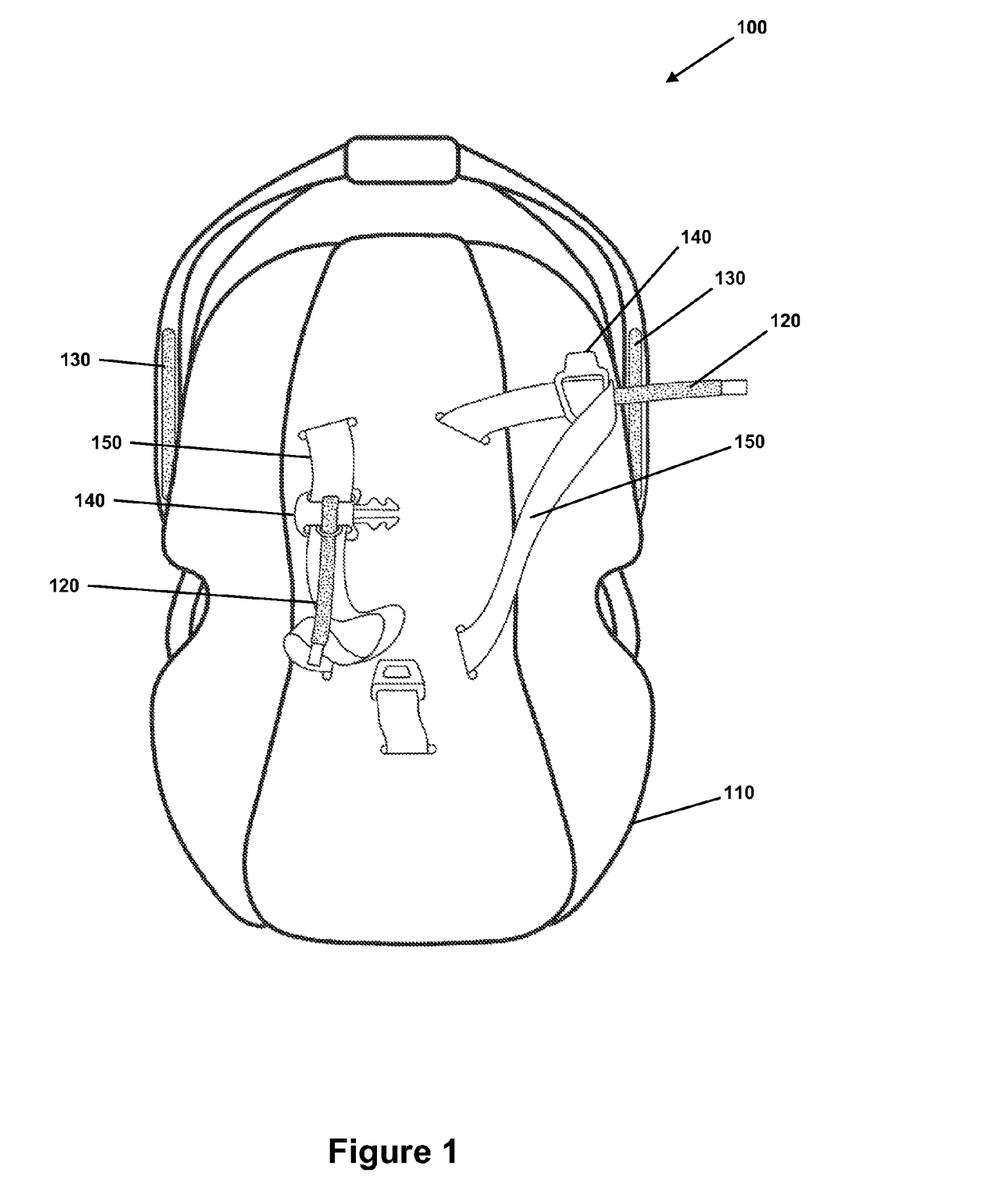
FIG. 1 shows a harness belt retaining system, according to an embodiment of the present invention.

FIG. 1 shows a harness belt retaining system 100, according to an embodiment of the present invention. The system 100 may include a child safety seat 110, a first portion 120, a second portion 130, a chest clip 140, and a harness belt 150.

The chest clip 140 may be designed or arranged to slide and secure to a length of the harness belt 150. The chest clip 140 may include two mating portions, each of which may be individually referred to as a chest clip 140 as discussed herein. The harness belt 150 may include two or more belt portions, each of which may be individually referred to as a harness belt 150.

Figure 2A:
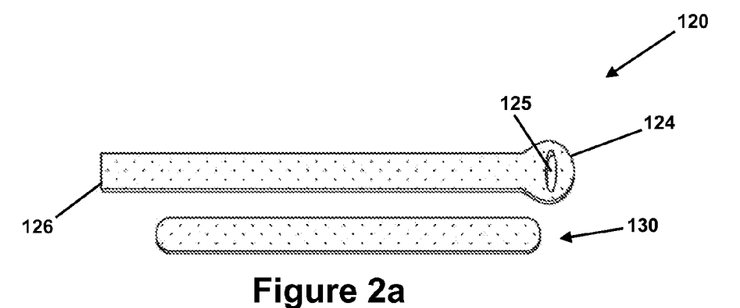
FIGS. 2A, 2B, 2C, and 2D show a first portion and a second portion of a harness belt retaining system, according to embodiments of the present invention.

Turning to FIG. 2A, the first portion 120 and the second portion 130 of the harness belt retaining system are shown, according to an embodiment of the present invention. The first portion 120 may include a first end 124, a second end 126, and an aperture 125 located proximate the first end 124. The first portion 120 may include a strap, or a strap-like portion. The first end aperture 124 may be designed to receive the second end 126 to form a loop in the first portion 120. For example, a strap portion of the first portion 120 may be fed through the first end aperture 124 thereby forming a loop. The loop may have an adjustable size, depending on how much of the strap portion of the first portion 120 has been fed through the aperture 124.

Figures 2B, 2C:
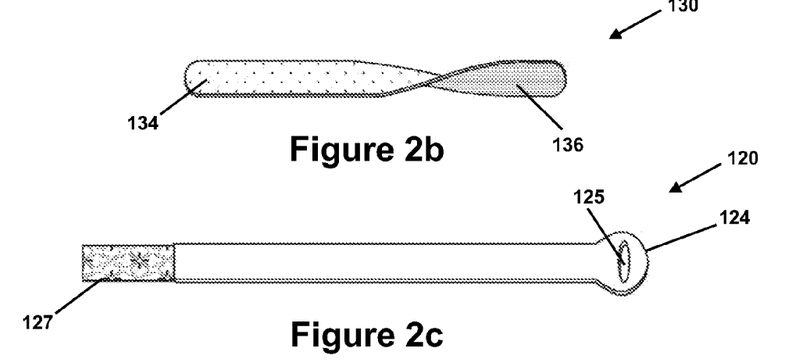
Figure 2D:
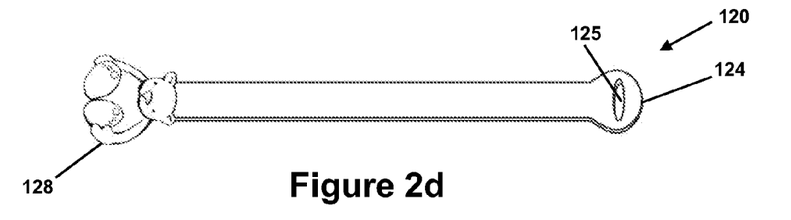

As shown in FIG. 2C, the second end 126 of the first portion 120 may include a decorative tag 127. The decorative tag 127 may have a decoration that is interesting to a child. As shown in FIG. 2D, the second end may include a toy 128. Such a decoration 127 or toy 128 may attract the attention of the child.

Turning to FIGS. 2A and 2B, the first portion 120 may include a first attachment portion, which may be attachable to the second portion 130. The first attachment portion, for example, may extend across the length of the first portion 120 (or just a segment thereof). The first attachment portion may be on one or both faces of the first portion 120.

The second portion 130 may include a second attachment portion. The first attachment portion and the second attachment portion may be removably attachable with each other. Accordingly, the first portion 120 and the second portion 130 may also be removably attachable. For example, the first attachment portion and the second attachment portion may be a hook-and-loop fastener (e.g., a low-profile hook-and-loop fastener). It is possible that the first attachment portion would have hooks and the second attachment portion would have loops (or vice versa). The first attachment portion and the second attachment portion may have an adhesive (e.g., on the first or second attachment portions, or both).

The second portion may have a first surface 134 and a second surface 136. One of these surfaces may have an adhesive to secure to the child safety seat 110 and the other surface may have the second attachment portion to secure to the first attachment surface.

Referring to FIG. 1, the second portion 130 may be located on a lateral portion of the child safety seat 110. As shown, the second portion 130 is located on a portion of a carrier arm of the child safety seat 110. The second portion 130 may also be located on the seat fabric or the seat frame of the child safety seat 110. The second portion 130 may be attached (removably or otherwise) to the child safety seat 110. For example, the second portion 130 may be attached with an adhesive on one of the surfaces 134, 136 of the second portion 130. The other one of the surfaces 134, 136 may include the second attachment portion.

The location for attaching the second portion 130 on the child safety seat 110 may be selected to pull the chest clip 140 away from a back rest of the child safety seat when the first attachment portion and the second attachment portion are attached to each other. In such a configuration, the harness belt 150 and chest clip 140 may be retained in a position so that an adult can place the child into the child safety seat 110 without having to move, fish, or fumble with harness belts or chest clips that are lying on the back rest or the seat-bottom of the child safety seat 110—e.g., compare the harness belt 150 on the left side of FIG. 1 (sagging into the back rest and the seat-bottom) with the harness belt 150 on the right side (retained so that a child may be placed into the child safety seat 110 without substantial interference with the harness belt 150).

Figure 3:
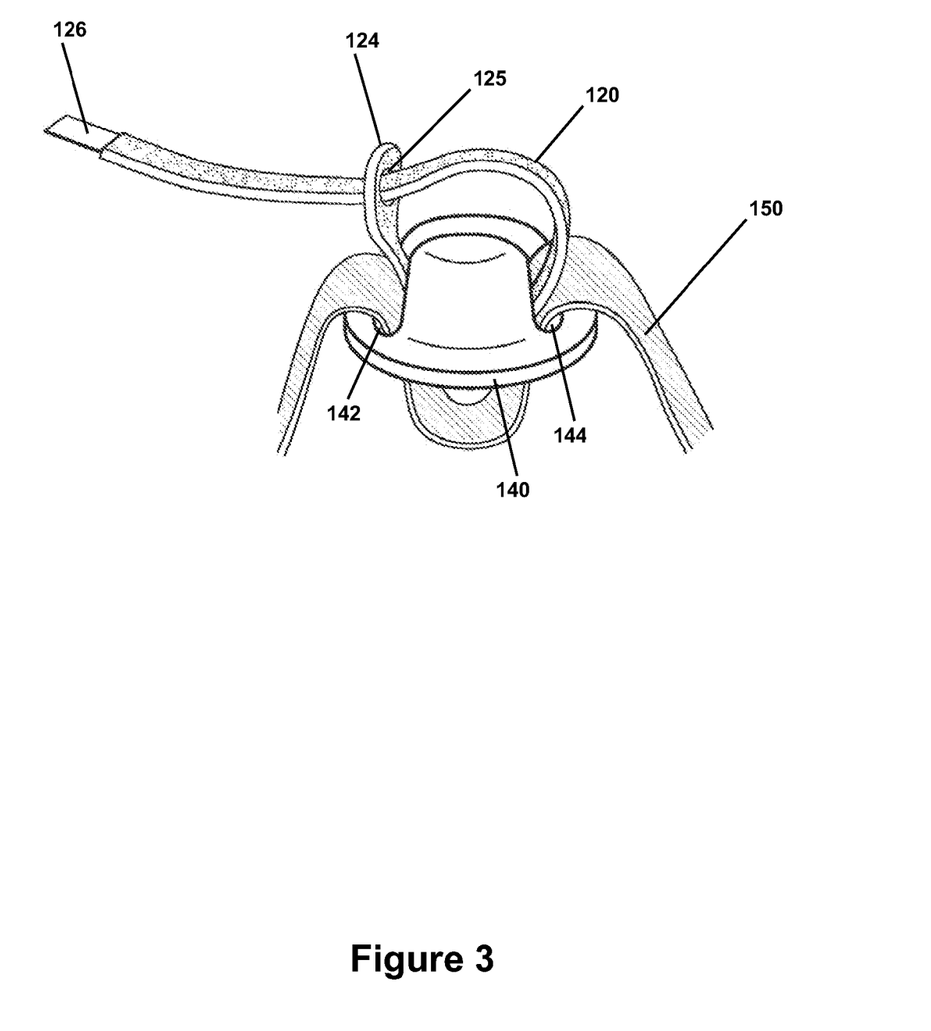
FIG. 3 shows a first portion, a chest clip, and a harness belt of a harness belt retaining system, according to an embodiment of the present invention.

Turning to FIG. 3, the first portion 120, the chest clip 140, and a harness belt 150 of a harness belt retaining system, according to an embodiment of the present invention. As illustrated, the first portion 120 has been formed into a loop. The first portion 120 has been fed through apertures 142, 144 in the chest clip 140. In such a manner, the first portion 120 may be secured to the chest clip 140. A thickness of the first portion 120 may be selected such that the chest clip 140 can still slide along a length of the harness belt 150 without substantial extra difficulty. As shown in FIG. 1, the first portion 120 may be interposed between the front of the harness belt 150 and the chest clip 140.

Figure 4:
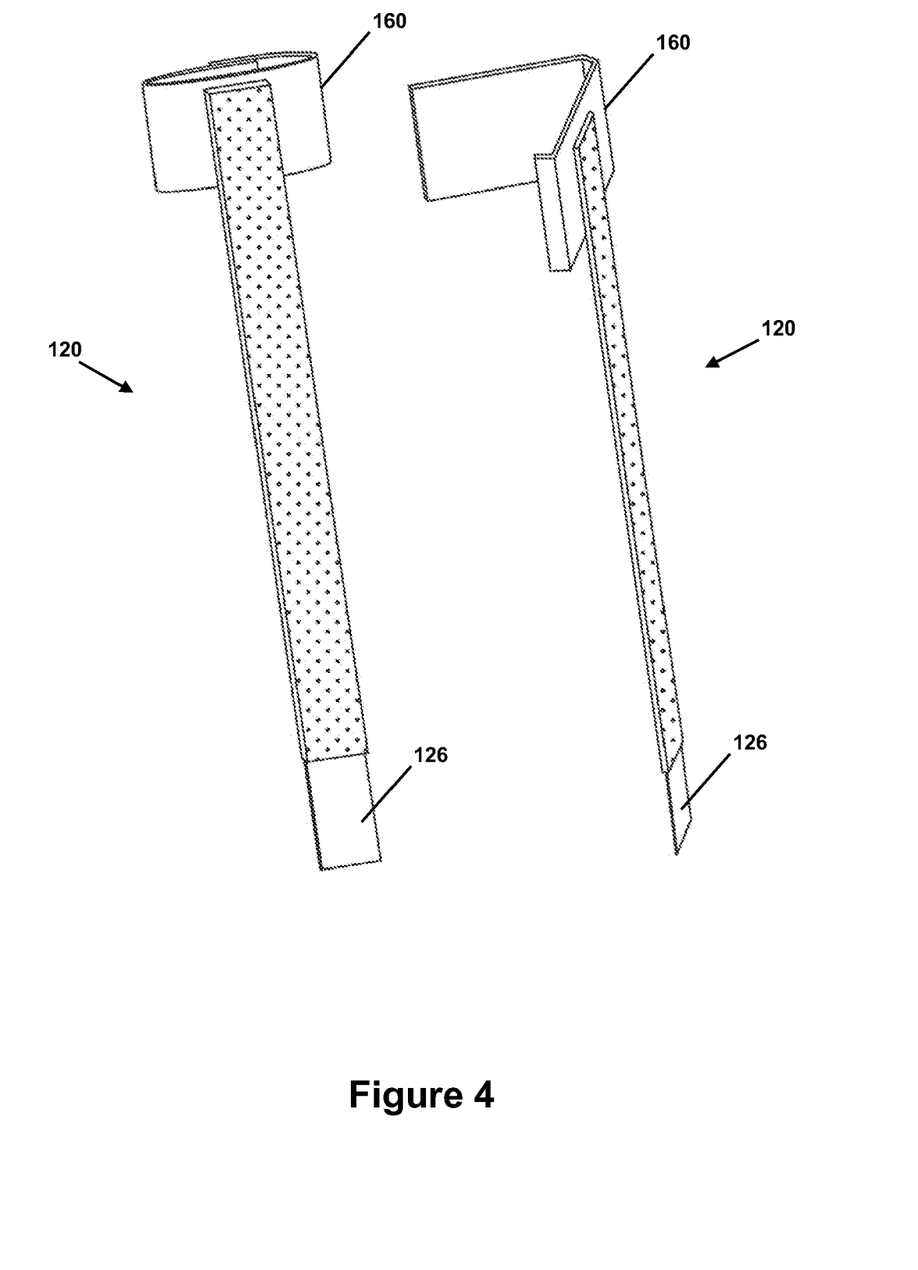
FIG. 4 shows a first portion and a rigid encompassing portion of a harness belt retaining system, according to an embodiment of the present invention.

Turning to FIG. 4, the first portion 120 and a rigid encompassing portion 160 of a harness belt retaining system are illustrated, according to an embodiment of the present invention. The rigid encompassing portion 160 may be configured to encompass a portion of the harness belt 150 (not shown). The rigid encompassing portion 160 may snap, lock, compress, or otherwise secure to the harness belt 150 by substantially encompassing the harness belt 150. The first portion 120 may be integrated or attached to the rigid encompassing portion 160. The first portion 120 may be removably or permanently attached to the rigid encompassing portion 160.

The harness belt retaining system 100 shown in FIG. 1 may be adapted to use the rigid encompassing portion 160. Instead of securing to the chest clip 140, the first portion 120 and the rigid encompassing portion 160 may secure to the harness belt 150 and be configured to pull the harness belt 150 away from a back rest of the child safety seat when the first attachment portion and the second attachment portion are attached to each other.

Figure 5A:
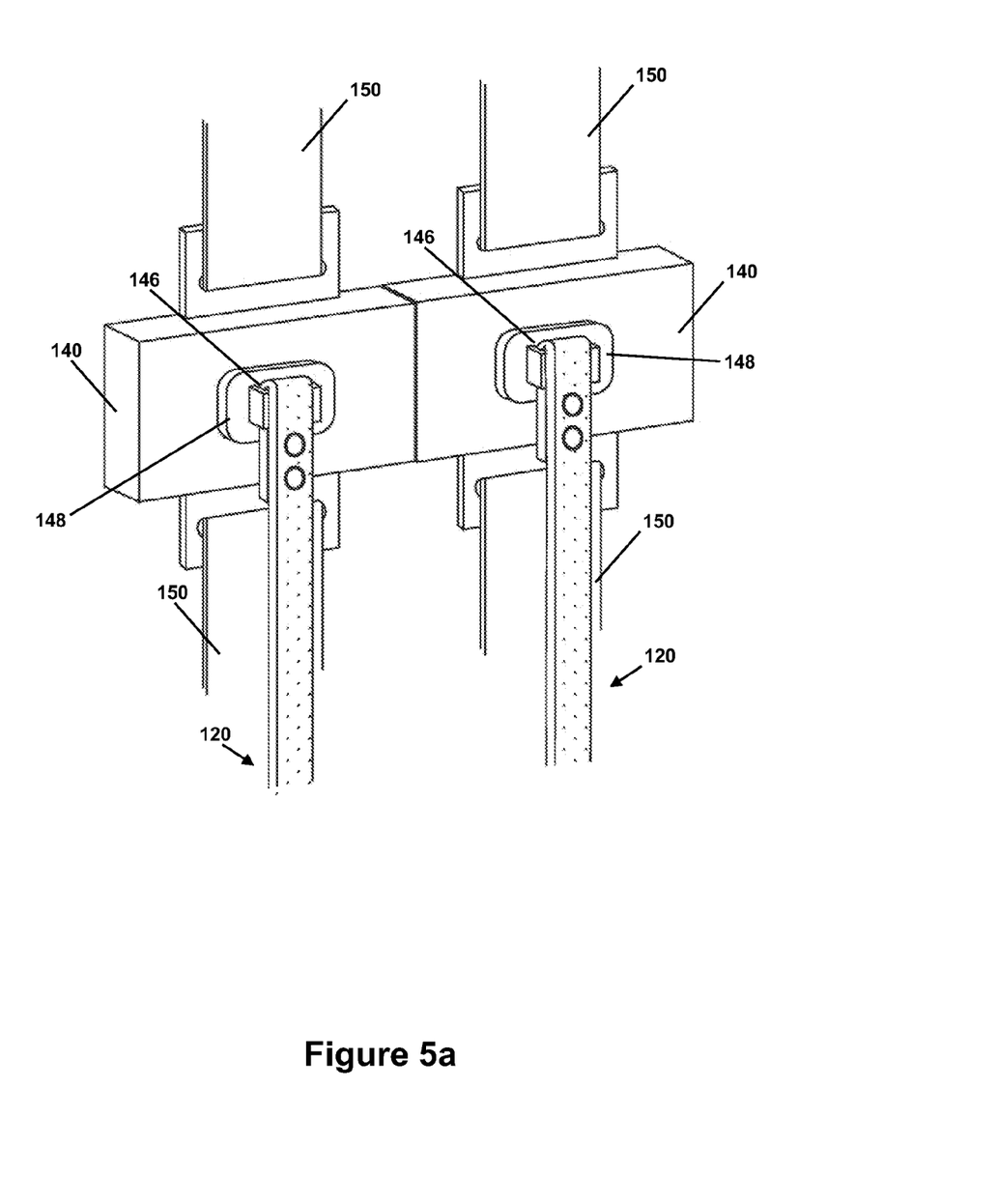
FIGS. 5A and 5B show a first portion, a chest clip and a harness belt according to embodiments of the present invention.
Figure 5B:
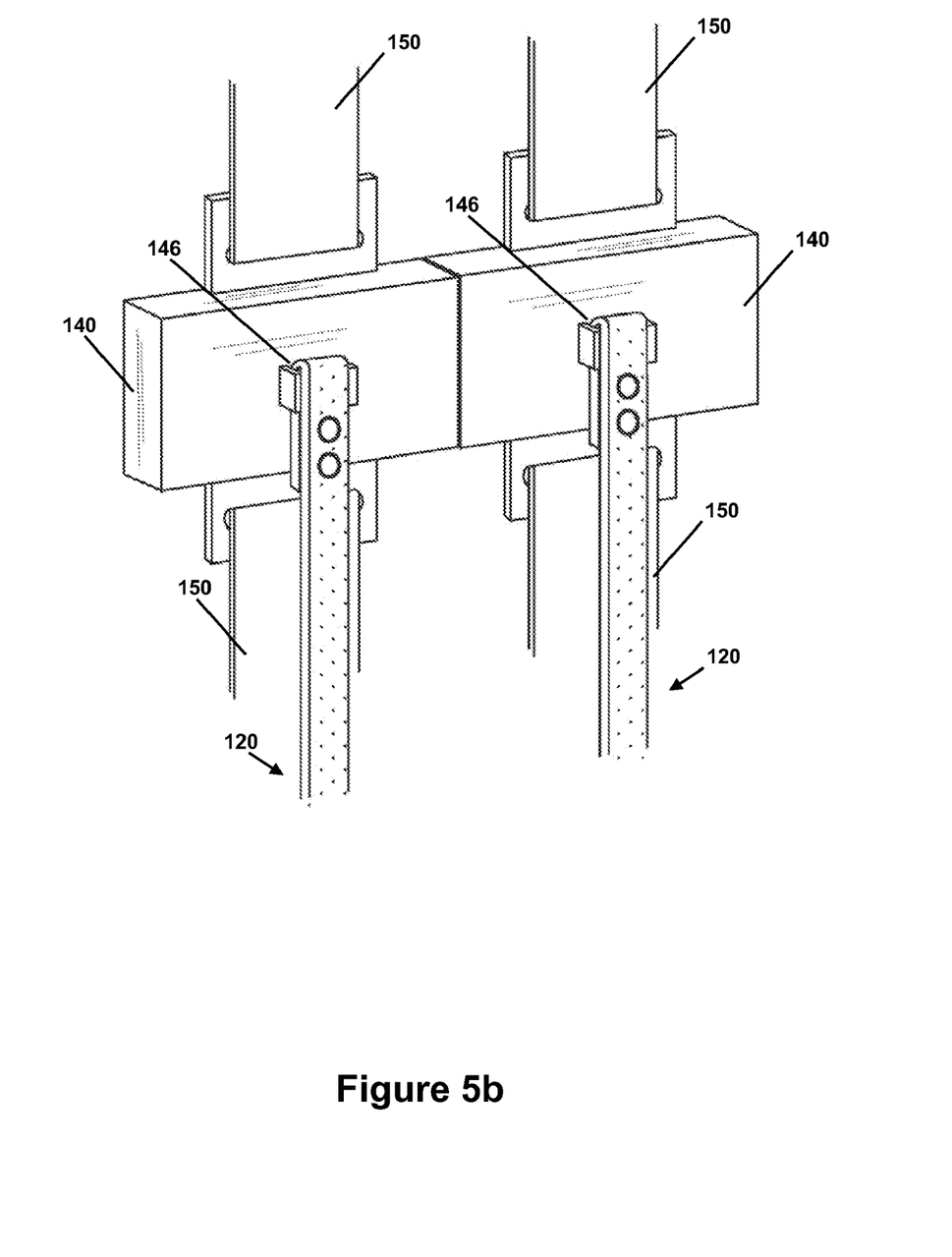

Turning to FIGS. 5A and 5B a first portion 120, a chest clip 140, and a harness belt 150 are shown according to embodiments of the present invention. The chest clip 140 may have tabs on opposing sides to secure to one or more harness belts 150. The chest clip 140 may have another aperture 146, for example, on its front face. The aperture 146 may be configured to receive the first portion 120. The first portion 120 may be secured to the aperture 146, for example, with snaps. As detailed in FIG. 5A, the aperture 146 may be mounted to a mounting portion 148. The mounting portion 148 may be attached to or removably secured to the chest clip 140, for example, on the front face of the chest clip 140.

Figure 6:
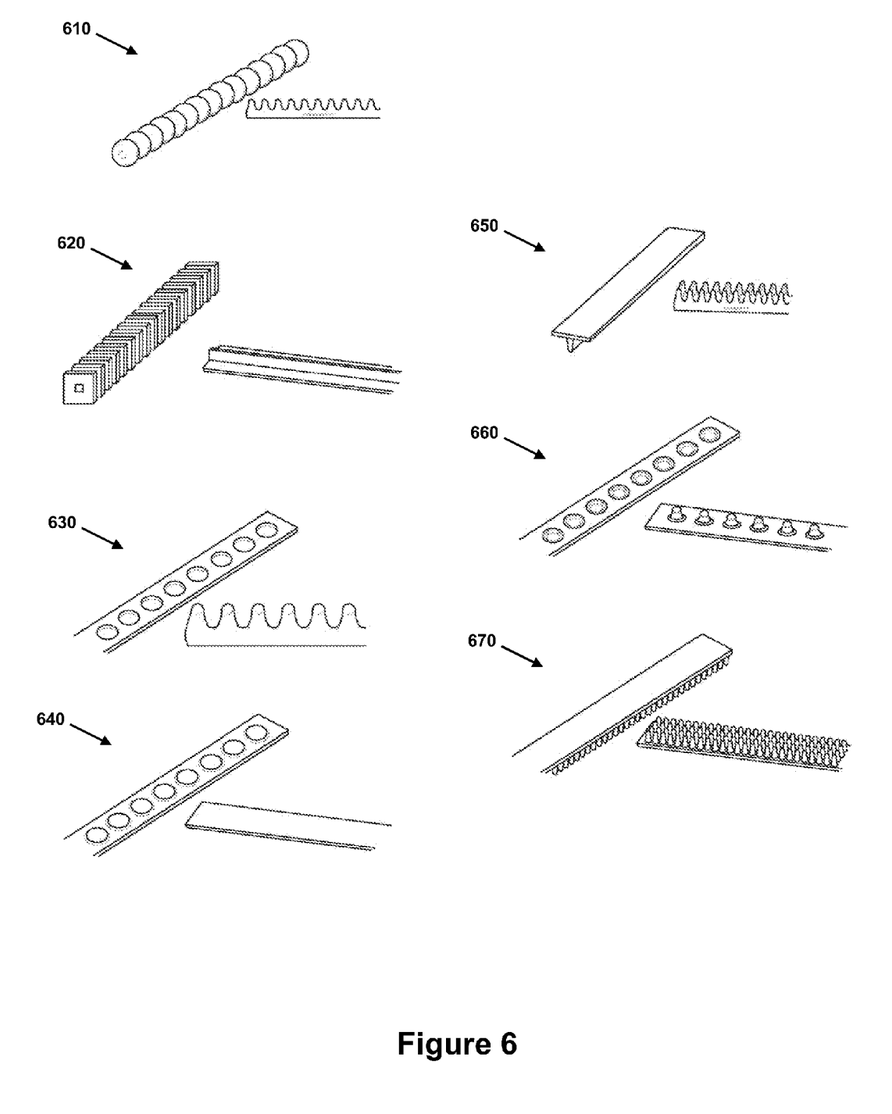
FIG. 6 shows different connectors, according to embodiments of the present invention.

Turning to FIG. 6, different fasteners are shown, according to embodiments of the present invention. Each of the fasteners has two mating parts. The fasteners may form a part of the first portion 120 and/or second portion 130. For example, one mating part of the fastener may be part of the first attachment portion, and the other mating part may be a part of the second attachment portion. The fasteners may be used to secure the first portion 120 and/or second portion 130. As an example, each fastener has two parts. One of the parts may be on the first portion 120 and the other part may be on the second portion 130. The fastener parts, then, may fasten together thereby attaching the first portion 120 to the second portion 130. One or more of the fastener parts may use an elastic material to assist with fastening.

FIG. 6 shows the following type of fasteners: a circular catch fastener 610, a rectangular catch fastener 620, a hole and peg fastener 630, a magnetic fastener 640, a channel press fit fastener 650, a snap fastener 660, and a rigid "velcro"-type fastener 670. Each of the fasteners is illustrated with repetitive fastening structures. For example, many different snap mating portions are shown in the snap fastener 660. The number of fastening structures may be increased or decreased. Other types of fasteners are also possible. For example, a hook-and-loop fastener is discussed above.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A harness belt retaining system for a child safety seat, the system comprising:
a first portion including a first attachment portion and a strap, wherein the first portion is configured to secure to a rigid encompassing portion on a harness belt; and
a second portion including a second attachment portion configured to be located on a lateral portion of the child safety seat,
wherein the first attachment portion and second attachment portion are configured to removably attach to each other such that the strap is interposed between the second attachment portion and the rigid encompassing portion, and
wherein the location on the lateral portion of the child safety seat is selected to pull the rigid encompassing portion away from a back rest of the child safety seat when the first attachment portion and the second attachment portion are attached to each other.

2. The harness belt retaining system of claim 1, wherein the rigid encompassing portion comprises a chest clip.

3. The harness belt retaining system of claim 1, wherein the first portion is configured to be secured through at least one aperture in the rigid encompassing portion.

4. The harness belt retaining system of claim 1, wherein the first attachment portion and the second attachment portion comprise a hook-and-loop fastener.

5. The harness belt retaining system of claim 1, wherein the lateral portion comprises a portion of at least one of a seat frame or a carrier arm.

6. A harness belt retaining system for a child safety seat, the system comprising:
a first portion including a first attachment portion and configured to secure to a chest clip on a harness belt; and
a second portion including a second attachment portion configured to be located on a lateral portion of the child safety seat,
wherein the first attachment portion and second attachment portion are configured to removably attach to each other,
wherein the location on the lateral portion of the child safety seat is selected to pull the chest clip away from a back rest of the child safety seat when the first attachment portion and the second attachment portion are attached to each other, and
wherein the first portion is configured to be secured through at least one aperture in the chest clip.

7. A harness belt retaining system for a child safety seat, the system comprising:
a first portion including a first attachment portion and configured to secure to a chest clip on a harness belt; and
a second portion including a second attachment portion configured to be located on a lateral portion of the child safety seat,
wherein the first attachment portion and second attachment portion are configured to removably attach to each other,
wherein the location on the lateral portion of the child safety seat is selected to pull the chest clip away from a back rest of the child safety seat when the first attachment portion and the second attachment portion are attached to each other, and
wherein the first portion is configured to be interposed between a portion of the front of the harness belt and a portion of the chest clip.

8. The harness belt retaining system of claim 7, wherein the first portion comprises a thickness selected to permit the chest clip to be adjusted along a length of the harness belt.

9. A harness belt retaining system for a child safety seat, the system comprising:
a first portion including a first attachment portion and configured to secure to a chest clip on a harness belt; and
a second portion including a second attachment portion configured to be located on a lateral portion of the child safety seat,
wherein the first attachment portion and second attachment portion are configured to removably attach to each other,
wherein the location on the lateral portion of the child safety seat is selected to pull the chest clip away from a back rest of the child safety seat when the first attachment portion and the second attachment portion are attached to each other, and
wherein the first attachment portion and the second attachment portion comprise a hook-and-loop fastener.

10. A harness belt retaining system for a child safety seat, the system comprising:
a first portion including a first attachment portion and configured to secure to a chest clip on a harness belt; and
a second portion including a second attachment portion configured to be located on a lateral portion of the child safety seat,
wherein the first attachment portion and second attachment portion are configured to removably attach to each other,
wherein the location on the lateral portion of the child safety seat is selected to pull the chest clip away from a back rest of the child safety seat when the first attachment portion and the second attachment portion are attached to each other, and
wherein the first portion comprises a strap.

11. The harness belt retaining system of claim 10, wherein the strap comprises a first end and a second end, wherein the first end comprises an aperture configured to receive the second end.

12. The harness belt retaining system of claim 10, wherein the strap is configured to form a loop comprising an adjustable size, and wherein the loop is configured to secure to the chest clip.

13. A harness belt retaining system for a child safety seat, the system comprising:
a first portion including a first attachment portion and configured to secure to a chest clip on a harness belt; and
a second portion including a second attachment portion configured to be located on a lateral portion of the child safety seat, wherein the first attachment portion and second attachment portion are configured to removably attach to each other, wherein the location on the lateral portion of the child safety seat is selected to pull the chest clip away from a back rest of the child safety seat when the first attachment portion and the second attachment portion are attached to each other, wherein the first surface includes an adhesive selected to secure the second portion to the lateral portion of the child safety seat, and wherein the second surface includes the second attachment portion.

14. A harness belt retaining system for a child safety seat, the system comprising:

a first portion including a first attachment portion and configured to secure to a chest clip on a harness belt; and a second portion including a second attachment portion configured to be located on a lateral portion of the child safety seat, wherein the first attachment portion and second attachment portion are configured to removably attach to each other, wherein the location on the lateral portion of the child safety seat is selected to pull the chest clip away from a back rest of the child safety seat when the first attachment portion and the second attachment portion are attached to each other, and wherein the first portion is configured to be removably secured to the chest clip.

15. A harness belt retaining system for a child safety seat, the system comprising:

a first portion including a first attachment portion and configured to secure to a chest clip on a harness belt; and a second portion including a second attachment portion configured to be located on a lateral portion of the child safety seat, wherein the first attachment portion and second attachment portion are configured to removably attach to each other, wherein the location on the lateral portion of the child safety seat is selected to pull the chest clip away from a back rest of the child safety seat when the first attachment portion and the second attachment portion are attached to each other, and wherein the second portion and the second attachment portion comprise a fabric of the child safety seat.

* * * * *